(12) United States Patent
Keane (10) Patent No.: US 8,707,646 B2
(45) Date of Patent: *Apr. 29, 2014

(54) LOW REFLECTED-SOUND-PRESSURE-LEVEL, LOW MOISTURE-VAPOR-TRANSMISSION-RATE FLOORING SYSTEM

(71) Applicant: Craig Patrick Keane, Mullica Hill, NJ (US)

(72) Inventor: Craig Patrick Keane, Mullica Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/889,955

(22) Filed: May 8, 2013

(65) Prior Publication Data

US 2013/0251976 A1    Sep. 26, 2013

Related U.S. Application Data

(63) Continuation of application No. 13/601,260, filed on Aug. 31, 2012, now Pat. No. 8,458,975, which is a continuation of application No. 13/246,235, filed on Sep. 27, 2011, now Pat. No. 8,276,338, which is a continuation of application No. 11/261,977, filed on Oct. 28, 2005, now Pat. No. 8,056,292.

(60) Provisional application No. 60/622,764, filed on Oct. 28, 2004.

(51) Int. Cl.
| | |
|---|---|
| *E04F 11/16* | (2006.01) |
| *E04F 15/22* | (2006.01) |
| *E04B 5/00* | (2006.01) |
| *E04C 1/00* | (2006.01) |
| *A63C 19/00* | (2006.01) |

(52) U.S. Cl.
USPC ............. 52/403.1; 52/177; 52/408; 52/309.8; 472/92

(58) Field of Classification Search
USPC ................. 52/177, 403.1, 408, 309.8; 472/92
See application file for complete search history.

(56) References Cited

U.S. PATENT DOCUMENTS

| | | | |
|---|---|---|---|
| 5,137,764 | A | 8/1992 | Doyle et al. |
| 5,578,363 | A | 11/1996 | Finley et al. |

(Continued)

OTHER PUBLICATIONS

Ach Foam Technologies, "Custom Molded EPE Physical Properties Data Sheet", http://www.achfoam.com/custom-molded-epe-physical-properties.aspx, ACH Foam Technologies, LLC; Retrieved Jul. 11, 2012 by Internet Archive Wayback Machine Beta, 2007, 1 page.

(Continued)

*Primary Examiner* — Brian Glessner
*Assistant Examiner* — Omar Hijaz
(74) *Attorney, Agent, or Firm* — Condo Roccia Koptiw LLP (57) ABSTRACT

A flooring system having a top floor layer, a sub-floor, and an underlayment material disposed between the sub-floor and the top floor layer is disclosed. The underlayment material may include a cross-linked, polyolefin foam having a moisture vapor transmission rate of less than about 3.0 lb/1000 ft$^2$/24 hr, and an average sound pressure level of less than about 15 dB over a range of about 300 Hz to about 1000 Hz. Foam density, gel fraction, and resin blend may combine to provide an underlayment material having such reflective sound and moisture vapor barrier properties.

7 Claims, 8 Drawing Sheets

(56) References Cited

U.S. PATENT DOCUMENTS

| | | | |
|---|---|---|---|
| 6,189,279 | B1 | 2/2001 | Fiechtl |
| 6,286,280 | B1 | 9/2001 | Fahmy et al. |
| 6,365,001 | B1 | 4/2002 | Helwig et al. |
| 6,524,978 | B1 | 2/2003 | Moore |
| 6,576,577 | B1 | 6/2003 | Garner |
| 6,579,610 | B1 | 6/2003 | Shortland et al. |
| 6,635,727 | B1 | 10/2003 | Koda et al. |
| 6,673,177 | B2 | 1/2004 | Buckwalter et al. |
| 6,803,110 | B2 | 10/2004 | Drees et al. |
| 6,837,014 | B2 | 1/2005 | Virtanen |
| 6,872,673 | B2 | 3/2005 | MacAulay |
| 7,441,384 | B2 | 10/2008 | Miller et al. |
| 7,735,279 | B2 | 6/2010 | Paradis et al. |
| 2002/0081410 | A1 | 6/2002 | Buckwalter et al. |
| 2002/0148185 | A1 | 10/2002 | Garduno |
| 2004/0129365 | A1 | 7/2004 | Buckwalter et al. |
| 2004/0197544 | A1 | 10/2004 | Ramesh et al. |
| 2005/0158517 | A1 | 7/2005 | Rives et al. |
| 2006/0179752 | A1 | 8/2006 | Swanson et al. |
| 2011/0023763 | A1 | 2/2011 | Morgan et al. |

OTHER PUBLICATIONS

Ami Acoustic Products Division, "Step Above™ Plus Flooring Underlayment Product Data Sheet", http://web.archive.org/web/20070114093646/http://www.soundprooffoam.com/step-above-plus.html; AMI Acoustic Products Division, American Micro Industries Inc., Chambersburg, PA, Feb. 17, 2006, 2 pages.

EC21-Youngbo Chemical Co., Ltd.-PE & PP Foam, EC 21 Global B2B Marketplace, http://youngbo.en.ec21.com/1/PE__PP__Foam.html, accessed Jul. 27, 2006, 2 pages.

Resilient Floor Covering Institute, "Resilient/Vinyl Glossary to RFCI", http://web.archive.org/web/20101129042226/http://rfci.com/index.php?option+com__contents, Retrieved Jul. 15, 2012 by Internet Archive Wayback Machine Beta 2010-2011, 5 pages.

Sekisui, Voltek-Ideas Formed in Foam, http://www.voltek.com/body__products.html, accessed Jul. 27, 2006, 2 pages.

Toray Plastics (America), Inc., "Welcome to Toray Plastics TORAYPEF-Polypropylene Foams", http://www.torayfoam.com/products/polypropylene.html, © 2005, accessed Jul. 27, 2006, 1 page.

U.S. Appl. No. 13/246,235, entitled "Low Reflected-Sound-Pressure-Level, Low Moisture-Vapor-Transmission-Rate Flooring System", filed Sep. 27, 2011, 14 pages.

LOW REFLECTED-SOUND-PRESSURE-LEVEL, LOW MOISTURE-VAPOR-TRANSMISSION-RATE FLOORING SYSTEM

CROSS-REFERENCE TO RELATED APPLICATIONS

This application is a continuation of U.S. patent application Ser. No. 13/601,260, filed Aug. 31, 2012, which is a continuation of U.S. patent application Ser. No. 13/246,235, filed Sep. 27, 2011, which is a continuation of U.S. patent application Ser. No. 11/261,977, filed Oct. 28, 2005, which claims benefit under 35 U.S.C. §119(e) of provisional U.S. patent application No. 60/622,764, filed Oct. 28, 2004, the disclosures of which are incorporated by reference herein in their entireties.

BACKGROUND OF THE INVENTION

A typical hardwood, laminate, or engineered flooring system may include two or more layers. A top layer typically details the pattern and texture of the product, and may include a protective layer, such as a hard coating, for durability. A core layer may be prepared from pressed fiberboard, for example, or from other suitable materials. A bottom layer may be included to stabilize the product and to protect it from deleterious effects of moisture. Frequently, laminate or engineered flooring systems employ some type of tongue and groove design to allow the pieces of the flooring to bond together without requiring the use of adhesive.

It is well-known that moisture may cause undesirable cupping or warping of the flooring system. A vapor barrier may be employed to protect the laminate or engineered flooring system from damage caused by moisture. Though a vapor barrier may provide some protection against moisture damage, vapor barriers tend to increase the cost and installation complexity of such flooring systems.

Another issue that may be experienced with flooring systems is the sound that may be produced when the floor is used. In multi-story structures, for example, sound created by use of an upper unit floor may be transmitted down into the unit below. Likewise, sound may be reflected back into the unit in which it is created. A sound barrier layer may be employed to reduce one or both of transmitted and reflected noise. Typical sound barrier layers include dense rubber and plastic sheets, corks, recycled fibers, and various types of foams. Such sound barriers, however, tend to be heavy and to add to the complexity and overall cost of installation.

Examples of conventional foams used in flooring applications have EPC contents, densities, and gel fraction that, in combination, result in compressive strengths below about 0.50 kg/cm$^2$. These properties of conventional olefin foam underlayments combine to produce relatively high reflected sound pressure levels (i.e., greater than about 13.5 dB average) in the 300 Hz to 1000 Hz range. Other underlayment materials, such as fiber pad, cork, and non-cross-linked foam, for example, also tend to produce relatively high reflected sound pressure levels in the 300 Hz to 1000 Hz frequency range. Such materials also tend to produce high moisture vapor transmission rates (MVTR) unless additional vapor barrier layers are incorporated.

Accordingly, it would be desirable if there were available flooring systems that produced relatively low sound reflection (e.g., less than about 13.5 dB average over a range of 300 to 1000 Hz) and moisture vapor transmission rates (e.g., less than about 3.0 lb/1000 ft$^2$/24 hr) by ASTM F 1249 test method, without the cost and installation complexity conventional systems typically involve.

SUMMARY OF THE INVENTION

A flooring system as disclosed herein may include an underlayment material that provides for low reflected sound pressure level (SPL) as well as low moisture vapor transmission rate (MVTR). Such a flooring system may include a top floor layer, a sub-floor, and an underlayment material disposed between the sub-floor and the top floor layer.

The underlayment material may include a cross-linked, polyolefin foam having an MVTR of less than about 3.0 lb/1000 ft$^2$/24 hr. The foam may produce an average reflected SPL of less than about 13.5 dB over a range of about 300 Hz to about 1000 Hz.

The foam may have a resin composition, foam density, and gel fraction that, in combination, produce the average reflected sound pressure level of less than about 13.5 dB. For example, the foam density may be at least about 30 kg/m$^3$ and the gel fraction may be at least about 40%. In an example embodiment, the foam density may be between about 50 kg/m$^3$ and about 60 kg/m$^3$, the gel fraction may be between about 50% and about 60%, and the foam may have a thickness between about 1.5 mm and about 2.5 mm. The foam may have a compressive strength of at least about 0.85 kg/cm$^2$.

The resin composition may include an olefin homopolymer or copolymer, such as a blend of polyethylene and polypropylene copolymer, such as ethylene propylene copolymer and linear low-density polyethylene. The ethylene propylene copolymer content may be at least 20% by weight. The foam may have a fine cell structure with cells having diameters between about 0.1 millimeter and about 1 millimeter.

The underlayment material may include an additive, such as an anti-microbial additive, a flame retardant additive, or an adhesion promoter. A vapor barrier layer may be disposed between the top floor layer and the sub-floor. The foam may be laminated to another layer, which may include a nonwoven, a film, and another foam. The foam may be embossed, textured, or molded.

The underlayment material may be lightweight, thereby making the installation of the underlayment material easy and convenient. For example, a 100 ft$^2$ roll of the underlayment material may weigh less than about 5 lbs. Thus, a polyolefin foam underlayment material may provide, in combination, low moisture vapor transmission rates (MVTR), low reflected sound pressure levels (SPLs), and a light weight.

DETAILED DESCRIPTION OF ILLUSTRATIVE EMBODIMENTS

Figure 1:
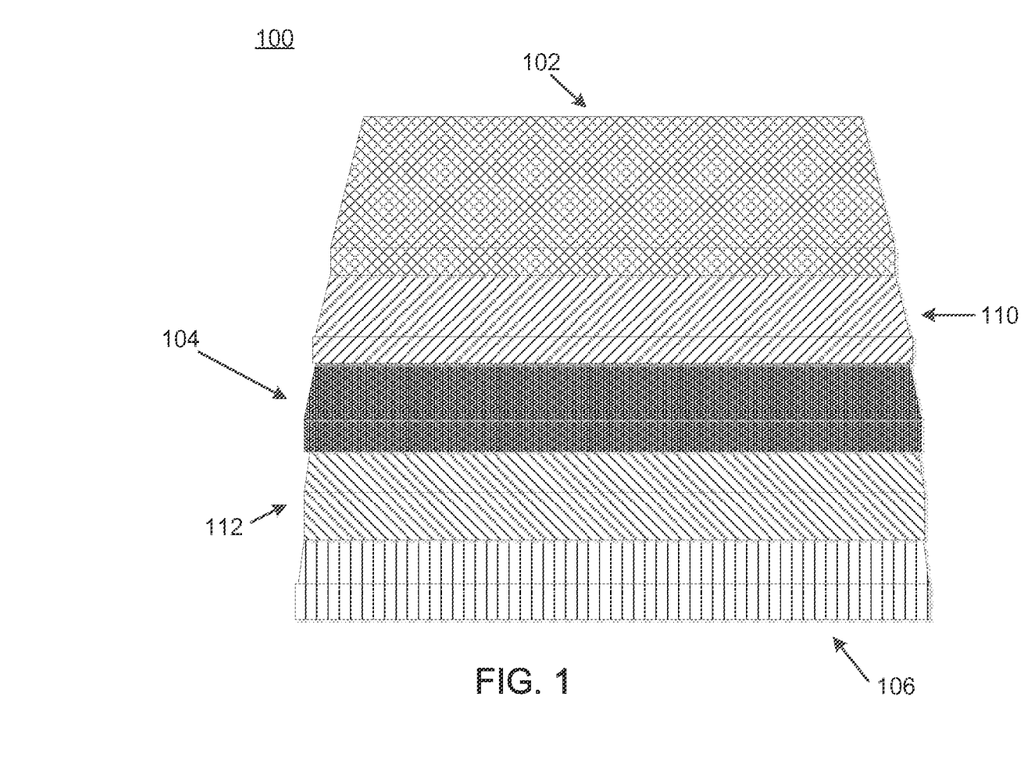
FIG. 1 depicts an example of a flooring system with an underlayment material that provides for low reflected sound pressure level (SPL) as well as low moisture vapor transmission rate (MVTR).
Figure 2A:
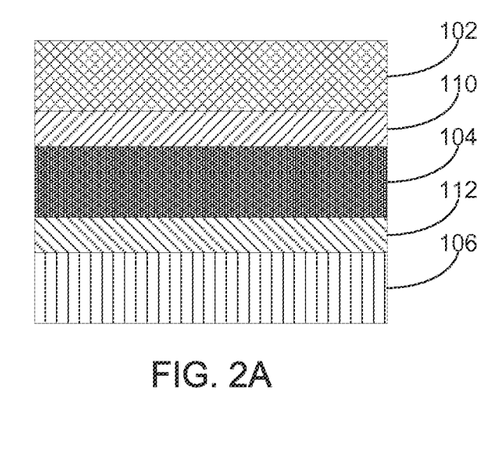
FIGS. 2A and 2B depict cross-sectional views of flooring systems with underlayment material layers that provide for low reflected SPL and MVTR.

As shown in FIGS. 1 and 2A, an example flooring system 100 may include a top floor layer 102, a foam underlayment material 104, and a sub-floor 106. The top floor layer may include, for example, a laminate or hardwood flooring material. The underlayment material 104, which is described in detail herein, may be, for example, a foam underlayment material such as, the FloorMuffler™, which is manufactured by Toray Plastics (America), Inc. and distributed by Diversified Foam Products, Inc. (www.floormuffler.com). The sub-floor 106 may be a wood or concrete sub-floor, for example. It should be understood that the sub-floor 106 might be a previously-installed flooring system, for example, that is to be covered over, or any support structure, such as a system of floor joists, for example, on which the top layer 102 and underlayment material are installed to form a flooring system.

The layers 102, 104, and 106 may be affixed to one another by any practicable means. For example, the layers 102, 104, and 106 may be nailed or tacked together. Optionally, an adhesive 110 may be applied between the top floor layer 102 and the underlayment material 104. The adhesive 110 may be a high-performance wood adhesive, for example. Optionally, an adhesive 112 may be applied between the underlayment material 104 and the sub-floor 106. The adhesive 112 may be a high-performance underlayment adhesive, for example.

Figure 2B:
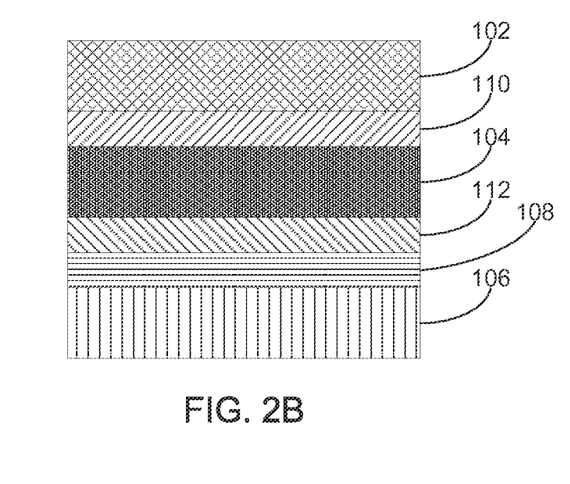

As shown in FIG. 2B, the flooring system may include an optional vapor barrier layer 108. As described in detail herein, the underlayment material may have moisture vapor transmission properties that are suitable for certain applications. In some applications, however, additional moisture vapor protection may be desirable. If desired, a vapor barrier layer 108 may be disposed between the top floor layer 102 and the sub-floor 106. The vapor barrier layer 108 may be a film, which may be a polypropylene film, disposed between the underlayment material 106 and the sub-floor 104. The vapor barrier layer may be adhered to the underlayment material and/or to the sub-floor. It should be understood that the vapor barrier layer may be adhered to the underlayment material before it is rolled (as described below). Thus, the underlayment material may be delivered to the point of installation with the optional vapor barrier already adhered thereto, thus simplifying installation of the underlayment and vapor barrier.

The underlayment material 104 may include a cross-linked polypropylene copolymer (EPC) and a linear low density/polyethylene (LLDPE) blend foam with an EPC content of about 20% to 90% by weight. Preferably, the EPC content is between 50% and 90%. More preferably, the EPC content is between 70% and 90%. Other olefin materials that are suitable for use include, for example, homopolymers and copolymers of polyethylene, including high-density polyethylene (HDPE), low-density polyethylene (LDPE), very-low-density polyethylene (VLDPE), ultra-low-density polyethylene (ULDPE), and polymers or copolymers of polypropylenes, including cross-linked ethylene propylene copolymer.

The underlayment material 104 may have a 25% compressive strength of at least about 0.10 kg/cm$^2$, as measured by JIS K6767. Materials having compressive strength below about 0.85 kg/cm$^2$ tend to be too soft and produce high reflected SPL. Preferably, the underlayment material 104 has a 25% compressive strength of at least about 1.0 kg/cm$^2$. More preferably, the underlayment material 104 has a 25% compressive strength of at least about 1.2 kg/cm$^2$.

Figure 3:
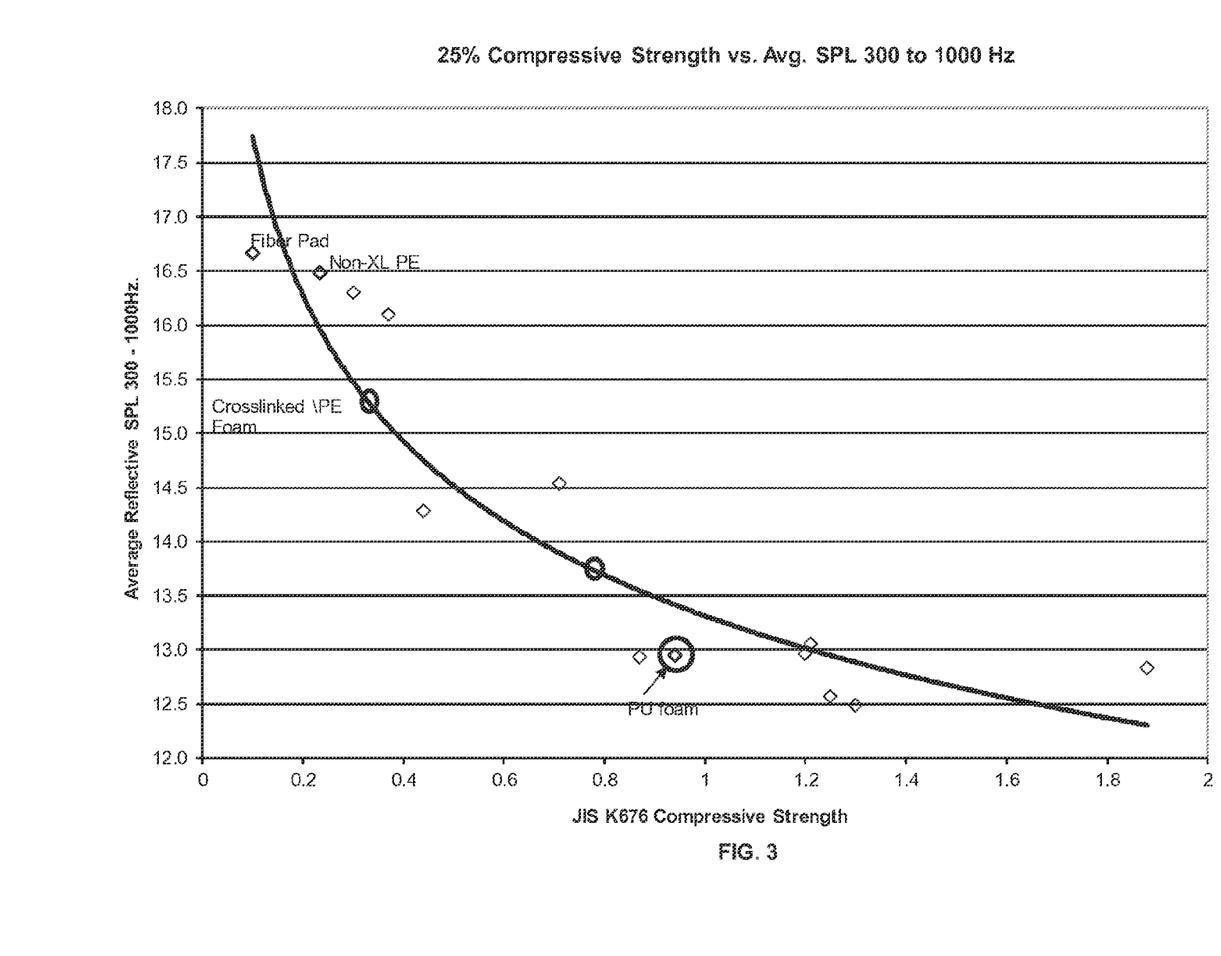
FIG. 3 provides a graph of average reflected SPL as a function of compressive strength for each of a number of underlayment materials.

FIG. 3 provides a graph of reflected sound pressure level, averaged over the range of 300-1000 Hz, as a function of compressive strength for a number of underlayment materials. As shown, foams with 25% compressive strengths of at least about 0.85 kg/cm$^2$ tend to produce average reflected sound pressure levels of less than about 13.5 dB. FIG. 3 also provides data for underlayment materials used in prior art flooring systems, with compressive strengths of less than about 0.85 kg/cm$^2$, that tend to produce average reflected sound pressure levels of more than about 13.5 dB.

Compressive strength is a property of the foam structure obtained primarily by the selection of resin, foam density, and the manufacturing processes used to convert resin into foam. It should be understood that higher polypropylene content may produce higher compressive strength and, accordingly, lower average reflected SPL. Density may also be a factor. For example, to increase compressive strength from approximately 3 kg/cm$^2$ to approximately 6 kg/cm$^2$, the foam density might need to be increased from about 100 kg/m$^3$ to about 121 kg/m$^3$.

Figure 4A:
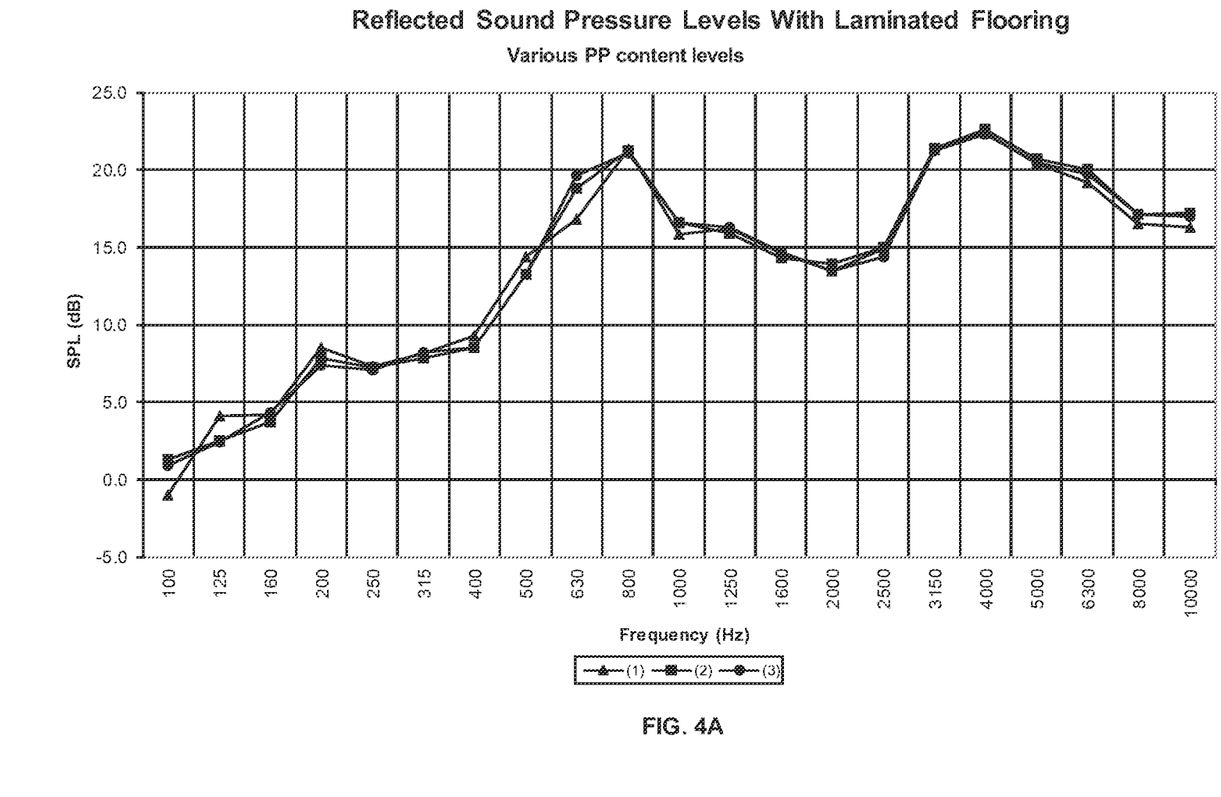
FIGS. 4A-4D provide graphs of average reflected SPL as a function of frequency for various foam underlayment materials.

FIG. 4A provides graphs of average reflected SPL as a function of frequency for various polypropylene content embodiments of a foam underlayment material according to the invention. Average reflected SPL graphs are provided for embodiments having polypropylene content of about: (1) 25 to 30%, (2) 50% to 60%, and (3) 70% to 90%.

The gel fraction (a.k.a., cross-link percentage or cross-link level) may range from about 15% to about 80%. Higher cross-link levels are possible; however, if cross-linking is too high, the foam will be difficult to roll onto a core, and will be difficult to lay flat making installation difficult. A preferable range of cross-linking is 40% to 60%, while the most preferable range is 50% to 60%. The type of resins selected, the amount of chemical cross-linking agent used, and the amount of exposure to a radiation source such as an electron beam irradiation device determine the degree of cross-linking. Also, in general, higher cross-link percentage provides slightly higher compressive strength. It is expected, therefore, that higher cross-link percentage should lead to slightly lower reflected SPL. It is also expected that higher cross-link percentage should also lead to lower MVTR.

Figure 4B:
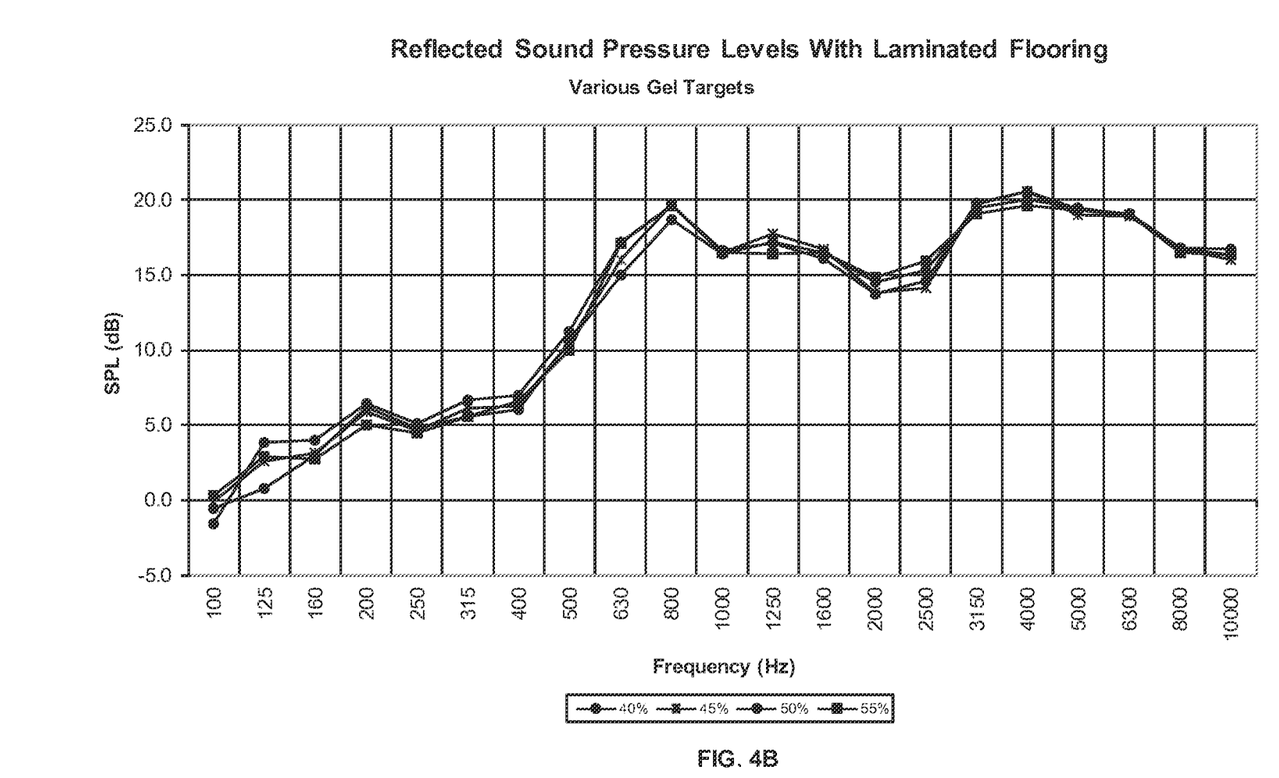

FIG. 4B provides graphs of average reflected SPL as a function of frequency for various gel-fraction embodiments of a foam underlayment material according to the invention. Average reflected SPL graphs are provided for embodiments having gel fractions of about: (1) 40%, (2) 45%, (3) 50%, and (4) 55%.

The density of the underlayment, as determined by method ASTM D3575, may be about 20 to 200 kg/m$^3$. More preferably the density is 40 to 100 kg/m$^3$, while the most preferable range is 50 to 60 kg/m$^3$. Foam densities of less than about 25 kg/m$^3$ are possible; however, the underlayment may be too soft and compress under loading. Higher density tends to increase the compressive strength of the foam and thereby reduce the reflected SPL. Increasing foam density, however, tends to add to product cost due to increased raw material consumption to manufacture. For example, the 25% compressive strength results (and associated reflected sound properties) described above may result from formulating a cross-linked polyethylene, polyethylene blend, or other polymeric foam at higher densities (such as 100 to 200 kg/m$^3$), though it is expected that such formulation may be cost prohibitive. Density may be controlled by a number of factors, the types of resins used, the degree of cross-linking, process conditions, and the type and amount of foaming agent used.

Figure 4C:
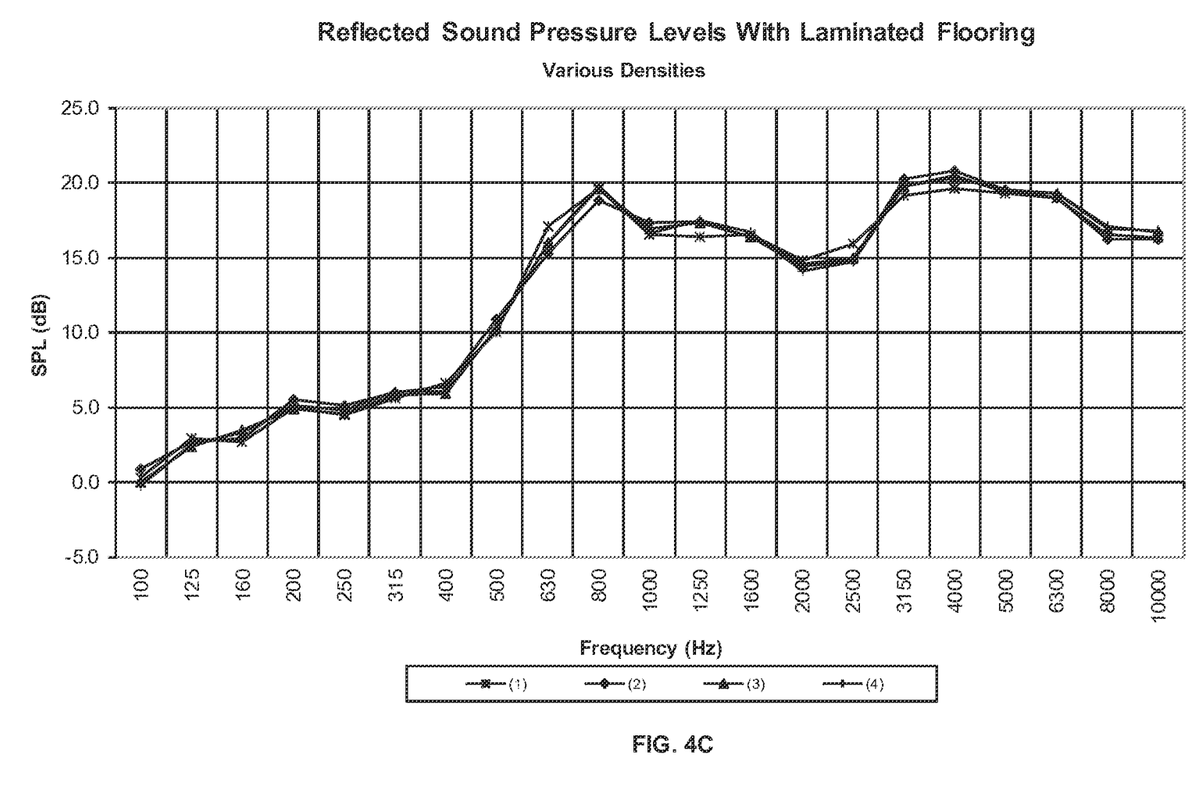

FIG. 4C provides graphs of average reflected SPL as a function of frequency for various density embodiments of a foam underlayment material according to the invention. Average reflected SPL graphs are provided for embodiments having a density of about: (1) 56 kg/m³, (2) 40 kg/m³, (3) 45 kg/m³, and (4) 50 kg/m³.

The thickness of the underlayment ranges from about 0.5 mm to about 6.0 mm, most preferably from 1.5 to 2.5 mm. Thinner foams than 0.5 mm may lack the resiliency under the loading of the flooring system. Foams thicker than about 6.0 millimeters are also suitable for underlayment membranes, however relatively thick layers of around 6.0 millimeters or more may interfere with wall molding or door clearances. Thickness is determined by the resin selection, type and amount of chemical foaming agent used, extruded sheet thickness, tension during the foaming operation, and the amount of heat applied during the conversion of sheet into foam.

Figure 4D:
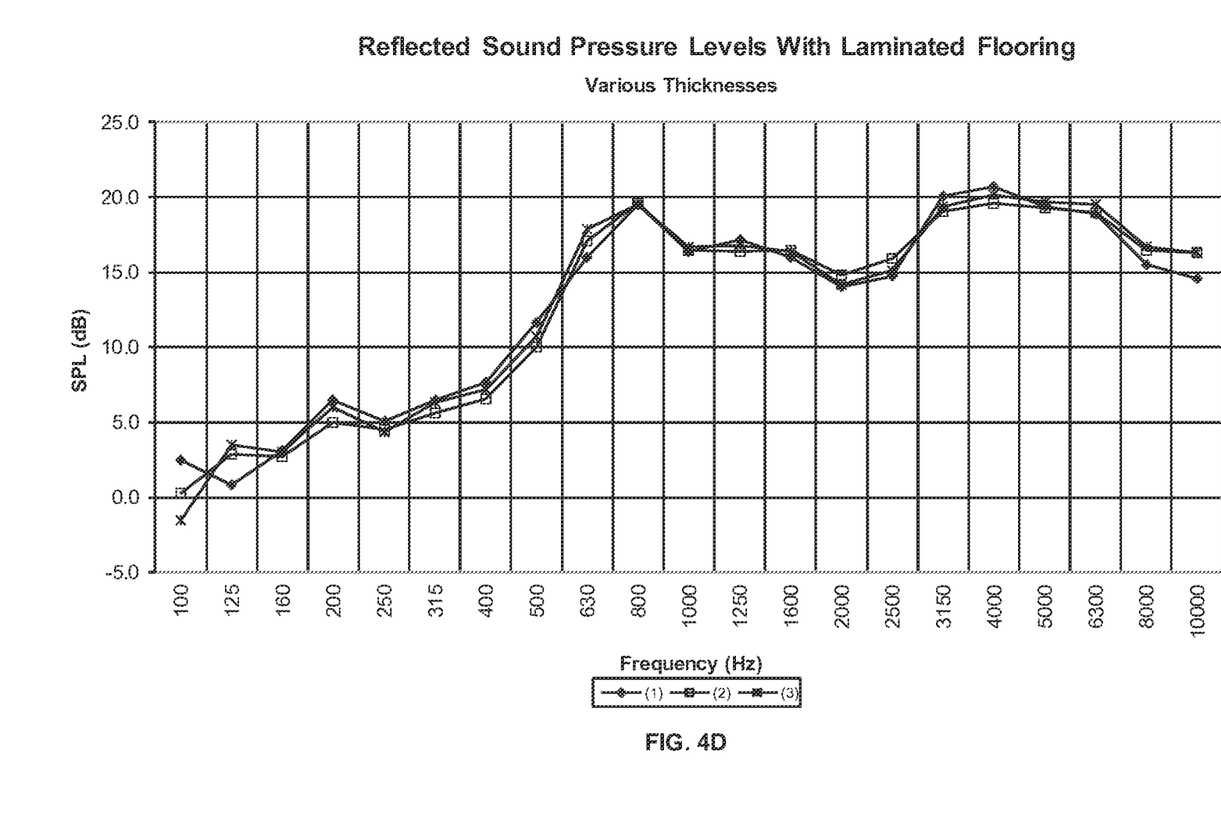

FIG. 4D provides graphs of average reflected SPL as a function of frequency for various thickness embodiments of a foam underlayment material according to the invention. Average reflected SPL graphs are provided for embodiments having thicknesses of about: (1) 4.5 mm; (2) 2.0 mm; and (3) 3.0 mm.

An underlayment material according to the present invention may provide for reduced MVTR, as well as improved reflected sound performance, without the need for the additional barrier layers, in a lightweight, easy-to-handle material. The current invention, with MVTR of <3.0 lb/1000 ft²/24 hr, meets flooring industry standards for MVTR of less than 3.0 lb/1000 ft²/24 hr without the need for additional vapor barrier layers that add to both product cost and weight. A 100 ft² roll of the underlayment foam weights less than about 5 lbs, while providing low reflected sound pressure levels in the 300 Hz to 1000 Hz range and MVTR performance that meets flooring industry standards. This light weight allows easy transport and easy handling and positioning during installation, with a minimum of manpower.

Example Methods for Manufacturing a Polyolefin Foam Underlayment Material

Figure 5:
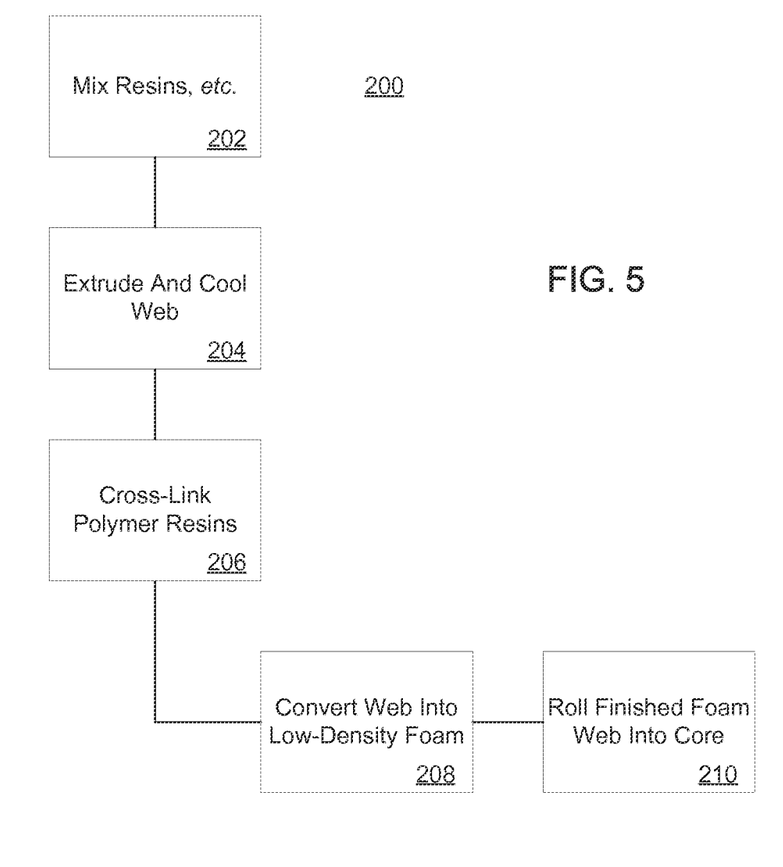
FIG. 5 is a flowchart of a method for manufacturing a low reflected SPL, low MVTR, cross-linked, polyolefin foam underlayment material.

FIG. 5 provides a flowchart of an example method 200 for manufacturing a polyolefin foam underlayment material. At 202, one or more polyolefin resins may be mixed with a foaming agent, one or more cross-linking agents, and/or one or more additives, into a homogenous mixture. Examples of polyolefin resins include polyethylene or polypropylene. Examples of cross-linking agents include peroxides (e.g., di cumyl peroxide, etc.) for polyethylenes, and di vinyl benzene for polypropylenes. Examples of additives include flame retardants, adhesion promoters, colorants, and anti-microbial agents.

A homogenous mixture may be achieved by spinning the mixture in a mechanical mixer designed for compounding plastic resins. Examples of such mixers are well-known. To ensure complete and proper mixing, agitation rate, temperature, and processing duration may be selectively controlled during this step by well-known industrial process control means.

At 204, the mixture may charged, for example, into a conventional plastics extruder, into which the ingredients are conveyed in a barrel by a screw, to produce a solid, thin, plastic web. The ingredients may be initially compressed and mixed as the materials move along the screw. Heater elements, along with the shearing action of materials against each other and the screw and barrel, cause the resins to melt into a viscous liquid state. Additives and/or colorants may be added to the product at this stage of the process as well. The screw pushes the melted extrudate through a die opening to produce the thin, solid web. The web may typically be between about 0.2 and about 3.0 millimeters in thickness, although not limited, as thicker or thinner webs can be produced as desired. As it is extruded, the web may cool from a molten state to a solid state. The web may then be trimmed, and wound into a roll.

At 206, the polymer resins may be cross-linked together. For example, irradiation of the polyolefin plastic can be done by electron beam. Other methods, such as chemical cross-linking, for example, may be employed. The degree of cross-linking may be controlled to result in a typical cross-link density of about 15% to about 80%. A higher percentage level of cross-linking is possible if desired. A desired degree of cross-linking may be achieved by the type of resins selected, the amount of chemical cross-linking agent used, and the exposure to a radiation source such as an electron beam irradiation device.

At 208, the continuous polymer web may be converted into a low-density foam. For example, the foam may be heated by radiant heaters, molten salt, hot air, or other heating devices. The heat causes a reaction of the chemical foaming agent that causes the foaming agent to releases gases, thus forming a cellular structure in the web. The combination of resins selected, cross-linking, and the process used may be selected to create a fine-celled structure, with typical cells ranging from about 0.1 to about 1.0 millimeter. It should be understood that larger and smaller cell sizes are possible.

A desired thickness may be achieved by the resin selection, type and amount of chemical foaming agent used, extruded sheet thickness, tension during the foaming operation, amount of heat applied during the conversion of sheet into foam. For example, an extruded sheet having a thickness of about 1 millimeter may produce a relatively high density polyolefin foam having a thickness of about 1.5 millimeter if little foaming agent is used. A relatively low density foam having a thickness of about 2.5 millimeter may be produced if a greater quantity of foaming agent is used.

A desired density may be achieved by the selection of resins used, the degree of cross-linking, process conditions, and the type and amount of foaming agent used.

At 210, the finished foam web may be rolled onto a core, such as a cardboard or paper tube, for example.

The foam web may undergo further processing at 212. For example, the foam web may be coated with an adhesive layer or release layer, laminated with films, fabrics, nonwovens, or other foams, or molded for any of a variety of uses, such as automotive instrument panels, gaskets, or packaging, for example.

Reflected Sound Test

Reflected sound pressure levels were measured using a test method loosely based on Association of European Producers of Laminate Flooring test method EPLF NORM021029-1. The test method employed was a simplified version of EPLF NORM021029-1 to compare relative differences in reflected sound between different underlayment materials. The sound source for the test was the tapping machine specified by ASTM E492 placed on the center of the test specimen. The test specimen consisted of a 6'×6' square sample of the particular underlayment and laminate flooring centered on a 12'×16'×6" concrete slab, which is specified for ASTM E492 testing. Three measuring microphones were placed in the same room as the tapping machine to measure the sound produced by the tapping machine impacting the floor sample. The microphones were placed 120 degrees apart, 1.5 meters from the center of the floor sample. Third octave frequency band measurements from 100 Hz to 10,000 Hz were taken for 15 seconds for each of the three microphones. The average sound pressure levels were then calculated for the 300 Hz to 1000 Hz range.

Determining the Percent of Polymer Cross-Linking Achieved by the Irradiation Process.

Apparatus used to determine the percent of polymer cross-linking included: 100 mesh, 0.004" wire diameter, type 304, stainless steel baggies; numbered wires & clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used included: a solvent, such as tetralin high molecular weight solvent, used to determine the gel fraction; acetone; and silicone oil.

An empty wire mesh bag was weighed and the weight recorded. For each sample, about 2 grams to about 10 grams+/−about 5 milligrams of sample was weighed out and transferred to the wire mesh bag. The weight of the wire mesh bag and the foam cutting was recorded in the Gel Fraction log.

Each bag was attached to the corresponding number wire & clips. Dissolving of non-crosslinked foam. When the solvent temperature reaches a target temperature, the bundle (bag and sample) was immersed in the solvent. The samples were shaken up and down about 5 or 6 times to loosen any air bubbles and fully wet the samples. The samples were attached to an agitator and agitated so that the solvent can dissolve the foam. Oil bath apparatus was shut off. The samples were then cooled in a fume hood.

The samples were washed by shaking up and down about 7 or 8 times in a container of primary acetone. The samples were washed a second time in a second acetone wash. The washed samples were washed once more in a third container of fresh acetone as above. The samples were hung in a fume hood to evaporate the acetone, about 1 to about 5 minutes.

The samples were dried in a drying oven for about 1 hour. The samples were cooled for a minimum of about 15 minutes. The wire mesh bag was weighed on an analytical balance and the weight was recorded.

Gel fraction could then be calculated as Gel Fraction=100*(C−A)/(B−A), where A=empty wire mesh bag weight; B=wire bag wt+foam sample before immersion in solvent; and C=wire bag wt+dissolved sample after immersion in solvent.

Thus, there have been described improved flooring systems having that produce relatively low sound reflection and moisture vapor transmission rates. It should be understood that the specific embodiments described herein are merely examples, and that the scope of the invention may be determined from the following claims. Specifically, it should be understood that the ranges provided for gel fraction, density, thickness, and polypropylene content, and the example combinations thereof described herein, are examples. It is contemplated that many other combinations of gel fraction, density, thickness, and polypropylene content may produce foams having reflected sound and moisture vapor barrier properties in accordance with the invention.

What is claimed:

1. A flooring system, comprising:
   a top floor layer;
   a sub-floor; and
   an underlayment material comprising a cross-linked, polyolefin foam disposed between the sub-floor and the top floor layer, wherein the underlayment material has a density in a range of 20 kg/m$^3$ to 200 kg/m$^3$, a thickness of at least about 0.5 mm, and a compressive strength of at least about 0.85 kg/cm$^2$, and
   wherein the flooring system produces an average reflected sound pressure level of less than about 15 dB over a range of about 300-1000 Hz.

2. The flooring system of claim 1, wherein the density is in a range of 40 kg/m$^3$ to 100 kg/m$^3$.

3. The flooring system of claim 1, wherein the compressive strength is at least 1.0 kg/cm$^2$.

4. The flooring system of claim 1, wherein the compressive strength is at least 1.2 kg/cm$^2$.

5. The flooring system of claim 1, wherein the thickness is in a range of about 0.5 mm to about 6 mm.

6. The flooring system of claim 5, wherein the thickness is in a range of about 1.5 mm to about 2.5 mm.

7. A flooring system, comprising:
   a top floor layer;
   a sub-floor;
   an underlayment material comprising a cross-linked, polyolefin foam disposed between the sub-floor and the top floor layer, wherein the underlayment material has a density in a range of 40 kg/m$^3$ to 100 kg/m$^3$, a thickness in a range of about 0.5 mm to about 6 mm, and a compressive strength that is at least about 1.0 kg/cm$^2$, and
   wherein the flooring system produces an average reflected sound pressure level of less than about 15 dB over a range of about 300-1000 Hz.

* * * * *